(12) United States Patent
Kemppinen

(10) Patent No.: US 7,507,044 B2
(45) Date of Patent: Mar. 24, 2009

(54) PORTABLE ELECTRONIC DEVICE

(75) Inventor: Pasi Kemppinen, Tampere (FI)

(73) Assignee: Nokia Corporation, Espoo (FI)

( * ) Notice: Subject to any disclaimer, the term of this patent is extended or adjusted under 35 U.S.C. 154(b) by 461 days.

(21) Appl. No.: 11/230,069

(22) Filed: Sep. 19, 2005

(65) Prior Publication Data

US 2007/0065220 A1    Mar. 22, 2007

(51) Int. Cl.
  *G06F 3/023* (2006.01)
  *G06F 1/16* (2006.01)
  *H04M 1/02* (2006.01)
  *H04M 1/21* (2006.01)

(52) U.S. Cl. .................. 400/489; 455/550.1; 455/556.2; 455/566; 455/575.1; 455/575.4

(58) Field of Classification Search .................. 345/1.1, 345/156, 169; 361/679, 680, 681; 379/428.01, 379/433.01, 433.11, 433.12, 433.13, 437; 455/550.1, 556.2, 566, 575.1, 575.3, 575.4, 455/90.3, 95, 351; *G09G 5/00*
See application file for complete search history.

(56) References Cited

U.S. PATENT DOCUMENTS

| | | | | |
|---|---|---|---|---|
| 6,111,527 | A | 8/2000 | Susel | 341/22 |
| 6,748,249 | B1 * | 6/2004 | Eromaki et al. | 455/575.4 |
| 6,834,199 | B2 * | 12/2004 | Hyun et al. | 455/575.1 |
| 6,983,175 | B2 * | 1/2006 | Kwon | 455/575.1 |
| 7,107,018 | B2 * | 9/2006 | Jellicoe | 455/90.3 |
| 7,269,450 | B2 * | 9/2007 | Lee et al. | 455/575.1 |
| 2003/0090468 | A1 * | 5/2003 | Finke-Anlauff | 345/169 |
| 2003/0222853 | A1 * | 12/2003 | Kim | 345/169 |

(Continued)

FOREIGN PATENT DOCUMENTS

EP    0 776 140    5/1997

(Continued)

*Primary Examiner*—Daniel J Colilla
(74) *Attorney, Agent, or Firm*—Ware, Fressola Van Der Sluys & Adolphson LLP

(57) ABSTRACT

An electronic device with multiple body elements is configurable to predetermined fixed portrait and landscape orientations each of which define a respective different operative position. A first panel overlies at least one portion of a main body element first surface and has a surface relative to usage and is arranged for sliding engagement with the main body, whereby in a first fixed configuration at least one portion of the main body element first surface is covered and not available for usage and in the second fixed configuration said at least one portion of the main body element first surface is uncovered and available for usage. A second panel overlies another portion of the main body element first surface and is arranged for rotational movement on the main body element parallel to the plane of the main body element first surface, whereby in the first fixed configuration the second panel is in a first orientation and in positional alignment adjacent the first panel and in the second fixed configuration the second panel is rotated on the main body element to a second orientation and in positional alignment adjacent the at least one portion of the main body element first surface. The main body element may be constructed with an arrangement of keys to carry out an intended function such as a QWERTY keyboard. A display screen may be constructed in the second body element and a key arrangement may be constructed in the third body element to carry out an intended function.

41 Claims, 8 Drawing Sheets

U.S. PATENT DOCUMENTS

| | | | |
|---|---|---|---|
| 2004/0224732 A1* | 11/2004 | Lee et al. | 455/575.3 |
| 2005/0078443 A1 | 4/2005 | Lee et al. | 361/683 |
| 2005/0078817 A1* | 4/2005 | Lee | 379/433.12 |
| 2005/0091431 A1 | 4/2005 | Olodort et al. | 710/72 |
| 2005/0245251 A1* | 11/2005 | Lee et al. | 455/422.1 |
| 2006/0073859 A1 | 4/2006 | Chou | 455/575.4 |
| 2006/0197714 A1 | 9/2006 | Chang | 345/156 |

FOREIGN PATENT DOCUMENTS

| | | |
|---|---|---|
| EP | 1 496 675 | 1/2005 |
| EP | 1 536 312 | 6/2005 |
| EP | 1 594 289 | 11/2005 |
| GB | 2350516 A * | 11/2000 |
| JP | 2003186598 A * | 7/2003 |

* cited by examiner

PORTABLE ELECTRONIC DEVICE

TECHNICAL FIELD

The present invention relates generally to electronic devices, particularly portable electronic devices and more specifically to portable electronic devices having multiple body elements configurable to predetermined fixed orientations each of which define a respective different operative position.

BACKGROUND OF THE INVENTION

The demand by users and the purchasing public that portable electronic devices, particularly mobile telephone devices, become increasing smaller and lighter while at the same time providing an increasing number of different functions in addition to the basic telephone communication functions places a premium on available surface space for the user interfaces necessary to carryout the intended functions and operations of the associated features. In addition, there is also a demand for larger size screens for displaying images and text, for example, text messaging and word processing or other mobile applications utilizing keyboard entry from for example, a QWERTY keyboard. This demand has required the manufacturer of such devices to design and develop innovative device enclosures capable of reconfiguration from one operative position to another to provide the necessary user interface to operate the device and to accommodate larger size screens and keyboards.

One such commonly known prior art electronic device enclosure, for example a mobile phone enclosure, is commonly know as the "flip" phone wherein the cover of the device is hinged to a main body element which carries a user interface relative to usage and the cover is "flipped" to open the device to make the user interface assessable to the user. The inside surface of the cover carries a screen to display alphanumeric characters, graphics, images and other representations common to such mobile phone devices and which are commonly known in the trade and by the consuming public. Although the "flip" phone enclosure configuration provides one method to expand the user interface surface and provide a larger screen display area while maintaining a relatively smaller size device enclosure compared to other mobile telephone devices wherein the user interface and the screen share a common surface area, it is not satisfactory to accommodate larger keyboards such as QWERTY and other well known keyboards.

Another prior art mobile telephone device enclosure as illustrated, for example, in FIGS. 1A-1C is the "slide" phone generally designated 10 wherein the cover 12 overlays a main body element 14 and is arranged for sliding engagement with the main body element 14. The cover 12 carries a screen 16 and may include keys 18 to carry out various intended functions of the device when the cover 12 is in its overlying operative position as shown in FIG. 1A. The device is configured to a second operative position when the cover 12 is slid by a user in the direction shown by arrow 20 to expose a surface 22 of the main body element 14 as shown in FIG. 1B wherein the surface 22 carries a user interface 24 which may be an arrangement of keys 26 in a desired pattern to carry out the intended function such as inputting a telephone number or entry of alphanumeric characters to the device in a well known manner. The device is returned to its closed operative position by sliding the cover 12 in the direction shown by the arrow 21. Although such "slide" phones provide ease of usage in changing from one operative position to another operative position, the increase in effective user interface area provided by prior art "slide" phones is not as effective as "flip" phones because of the limited movement of the cover 12 with respect to the main body element 14. As schematically illustrated in FIG. 1C, an overlap of the cover 12 and main body element 14 represented by the length 28 is typically a 50 per cent overlap and results in a hidden area 30 between the cover 12 and main body element 14 to maintain rigidity of the "slide" phone in its extended open position and thus the hidden area 30 of the main body element surface 22 is not available for usage as a user interface particularly a full keyboard, such as a QWERTY keyboard.

Additionally, the prior art electronic device "flip" and "slide" enclosures such as described above lack a multi-functional separate numeric keypad which would be useful with a QWERTY keyboard and as a communication keypad for example in a mobile phone.

Accordingly, there is a need to provide a portable electronic device having an enclosure that overcomes the limitations and disadvantages of the prior art portable electronic devices wherein one body element is arranged to move relative to another body element to increase the effective user interface area to accommodate a full function keyboard such as a QWERTY keyboard and a multi-functional numeric keypad useful with the QWERTY keyboard and as a communication keypad.

SUMMARY OF THE INVENTION

In accordance with a broad aspect of the invention, a portable electronic device, for example a mobile device, is presented and comprises a first body element having a first major surface, a second body element having a first major outwardly facing surface and a third body element having a first major outwardly facing surface. The second and third body elements are in an overlying relationship with the first main body element and are mechanically coupled thereto. Each of the second and third body elements is arranged for relative movement with respect to the first main body element to configure the first main body element, the second body element and the third body element in a number of predetermined fixed orientations each of which predetermined fixed orientations define a corresponding respective different operative position.

In a first operative position, the second body element is in a top-over-bottom orientation with respect to the third body element. The first main body element and the second body element are arranged for slideable movement with respect to one another between the first operative position and a second operative position wherein the second body element is slideably moved along a linear path in a first direction into a non-overlying relationship with the first main body element and out of the top-over-bottom orientation with respect to the third body element. The third body element is arranged for rotational movement about a pivot axis passing substantially perpendicular through the third body element first major outwardly facing surface and the first main body element first major surface to rotate the third body element between a first fixed orientation for example a portrait orientation in the first operative position, and a second fixed orientation for example a landscape orientation in the second operative position.

In a further aspect, a display screen is constructed in the second body element and a first key arrangement is constructed in the third body element. A second key arrangement is constructed in at least a portion of the first main body element wherein in the first operative position the second key arrangement is covered by the second body element and not accessible by a user and in the second operative position the second key arrangement is exposed and available for access and use by a user. The third body element first key arrangement is arranged in accordance with a desired function to be carried out and for example, may be arranged as a communication keypad or a numeric keyboard. The first main body element second key arrangement is arranged in accordance with a desired function to be carried out and for example, may be arranged as a QWERTY keyboard. The portable electronic device may include means for automatically changing if necessary the orientation of a display shown on the screen when the portable electronic is moved between the first and second fixed orientations, respectively.

In a further aspect, the second body element and said third body element are mechanically coupled to one another whereby movement of one of the body elements between the first and second fixed orientations causes the other of the body elements to move between the first and second fixed orientations, respectively. The second body element may be arranged with a rack gear and the third body element may be arranged with a round gear each gear having teeth for co-action with one another for causing the movement of the second and third body elements. Alternately, a swivel arm mechanism may be sandwiched between the second and third body elements and the main body element. The swivel arm mechanism has one end arranged for rotational movement about a second pivot axis passing substantially perpendicular through the second body element and an opposite end arranged for rotational movement about a third pivot axis passing substantially perpendicular through the third body element.

In accordance with another broad aspect of the invention, an electronic device, for example a portable electronic device such as a mobile device or a game unit is presented and comprises a first main body element having a first surface, a first panel overlying at least one portion of the main body element first surface. The first panel has a surface relative to usage and is arranged for sliding engagement with the main body element first surface, whereby in a first fixed configuration at least one portion of the main body element first surface is covered and not available for usage and in the second fixed configuration is uncovered and available for usage. A second panel overlies another portion of the main body element first surface and is arranged for rotational movement on the main body element parallel to the plane of the main body element first surface. In the first fixed configuration the second panel is in a first orientation and in positional alignment adjacent the first panel. In the second fixed configuration the second panel is rotated on the main body element to a second orientation and in positional alignment adjacent the at least one portion of the main body element first surface. A game controller keypad may be constructed in the at least one portion of the main body element first surface.

In a still further broad aspect of the invention, a portable electronic device is presented and comprises a first main body element having a first major surface relative to usage, a second body element having a first major surface relative to usage and a third body element having a first major surface relative to usage. A display screen is constructed in the second body element. A first key arrangement is constructed in the third body element in accordance with an intended function and a second key arrangement is constructed in at least a portion of the main body element in accordance with an intended function. The first main body element and the second body element are arranged for slideable movement with respect to one another wherein the second body element moves along a linear path in a first direction into a non-overlying relationship with the first main body element. The third body element is arranged for rotational movement about a pivot axis passing substantially perpendicular through the third body element and the first main body element for rotating the third body element in a plane parallel to the plane of the first main body element first major surface. The first main body element, second body element and third body element are mechanically coupled and arranged for relative movement with respect to one another to configure the portable electronic device in one of a portrait fixed orientation and landscape fixed orientation, whereby indicia carried on keys comprising the first key arrangement maintain proper positional orientation with respect to indicia carried on keys comprising the second key arrangement constructed in the at least a portion of the main body element.

In a yet further broad aspect of the invention, a computer program carried on a storage medium and executable by a processor in an electronic device for automatically changing, if required, the orientation of information shown on a display of the electronic device when the electronic device is used in its first open operative position and in its second open operative position is presented. The electronic device comprises a first main body element having a first major surface relative to usage, a second body element having a first major surface relative to usage and a third body element having a first major surface relative to usage. A display screen is constructed in the second body element and a first key arrangement is constructed in the third body element in accordance with an intended function. A second key arrangement is constructed in at least a portion of the main body element in accordance with an intended function. The first main body element and the second body element are arranged for slideable movement with respect to one another wherein the second body element moves along a linear path in a first direction into a non-overlying relationship with the first main body element. The third body element is arranged for rotational movement about a pivot axis passing substantially perpendicular through the third body element and the first main body element for rotating the third body element in a plane parallel to the plane of the first main body element first major surface. The first main body element, second body element and third body element are mechanically coupled and arranged for relative movement with respect to one another to configure the portable electronic device in one of a portrait fixed orientation and landscape fixed orientation, whereby indicia carried on keys comprising said first key arrangement maintain proper positional orientation with respect to indicia carried on keys comprising said second key arrangement constructed in the at least a portion of the main body element and whereby information shown on the display automatically is shown in the corresponding portrait and landscape orientation.

BRIEF DESCRIPTION OF THE DRAWINGS

Additional features, objects and advantages of the present invention will become readily apparent from the following written description taken in conjunction with the drawings wherein.

WRITTEN DESCRIPTION OF PREFERRED EMBODIMENTS

Figure 1A:
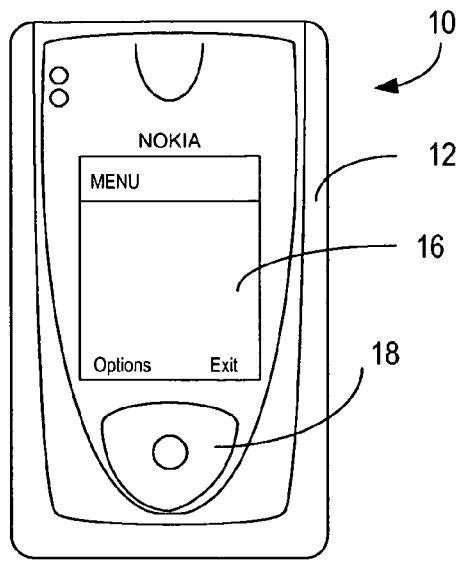
FIG. 1A is a top plan view of a prior art slide mobile telephone in its closed operative position.
Figure 1C:
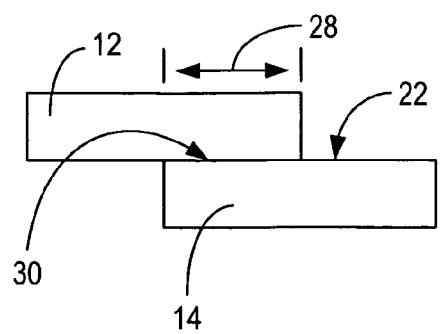
FIG. 1C is a schematic side view of the mobile telephone of FIG. 1B illustrating the overlapping area between the cover and main body element.
Figure 1B:
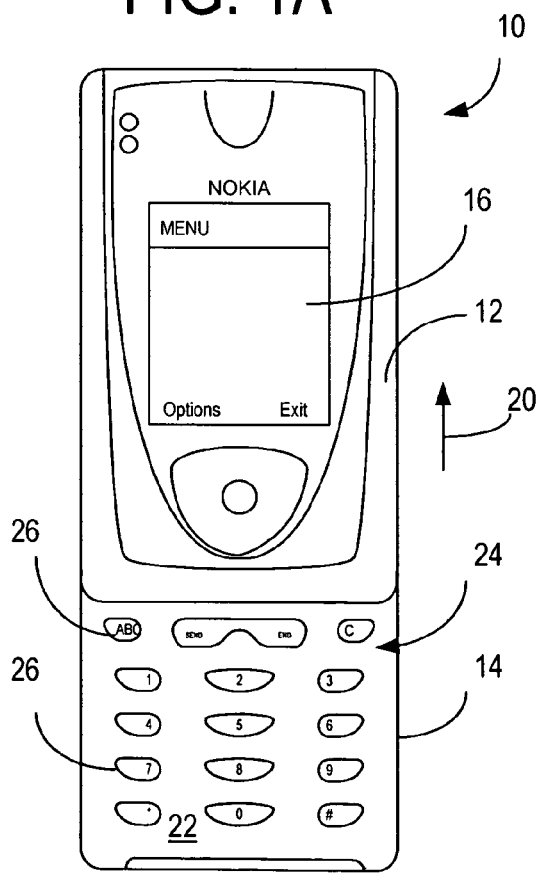
FIG. 1B is a top plan view of the slide mobile telephone of FIG. 1A in its open operative position.
Figure 2:
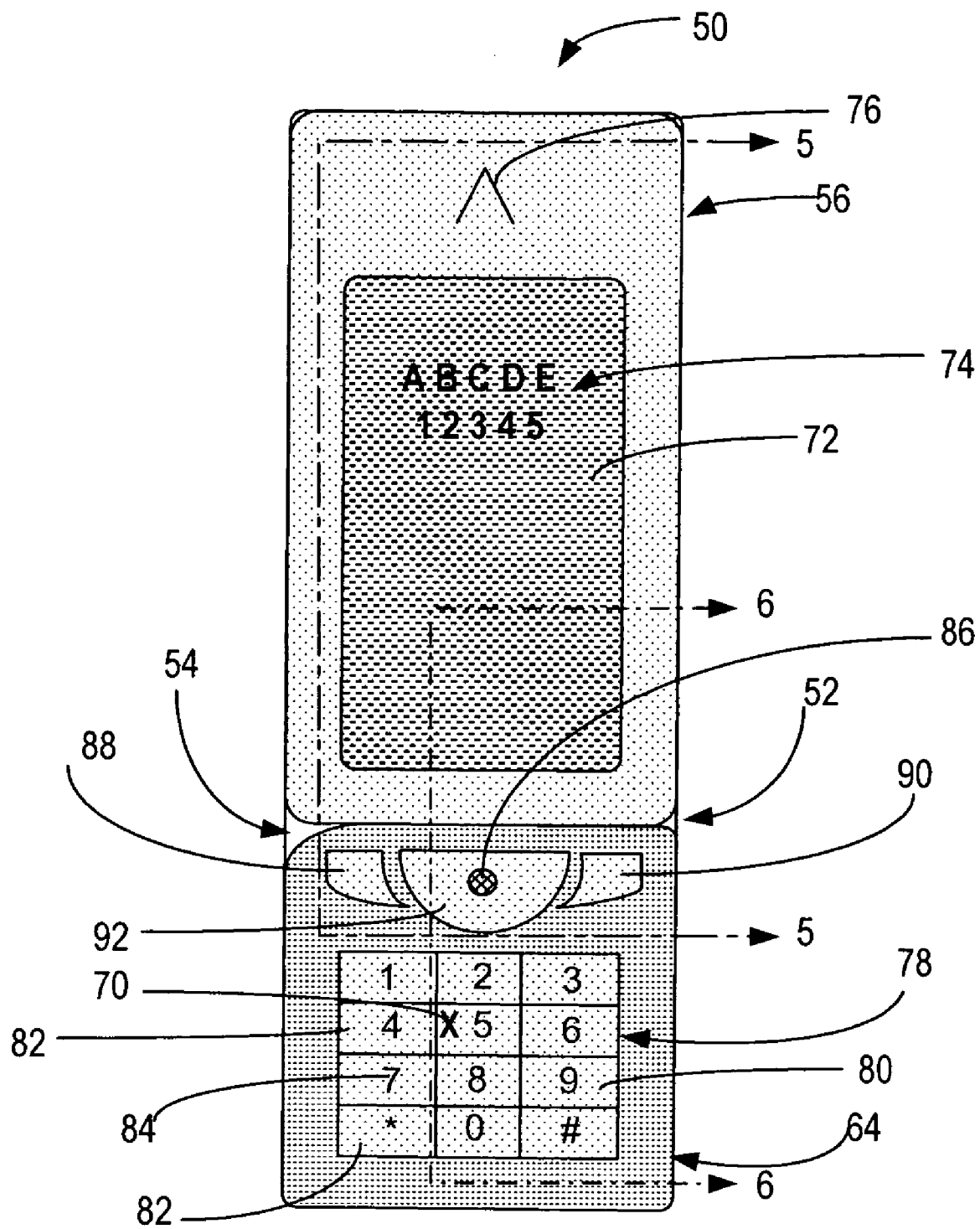
FIG. 2 is a schematic front plan view of an electronic device embodying the present invention shown in a first operative position in a portrait orientation.
Figure 3:
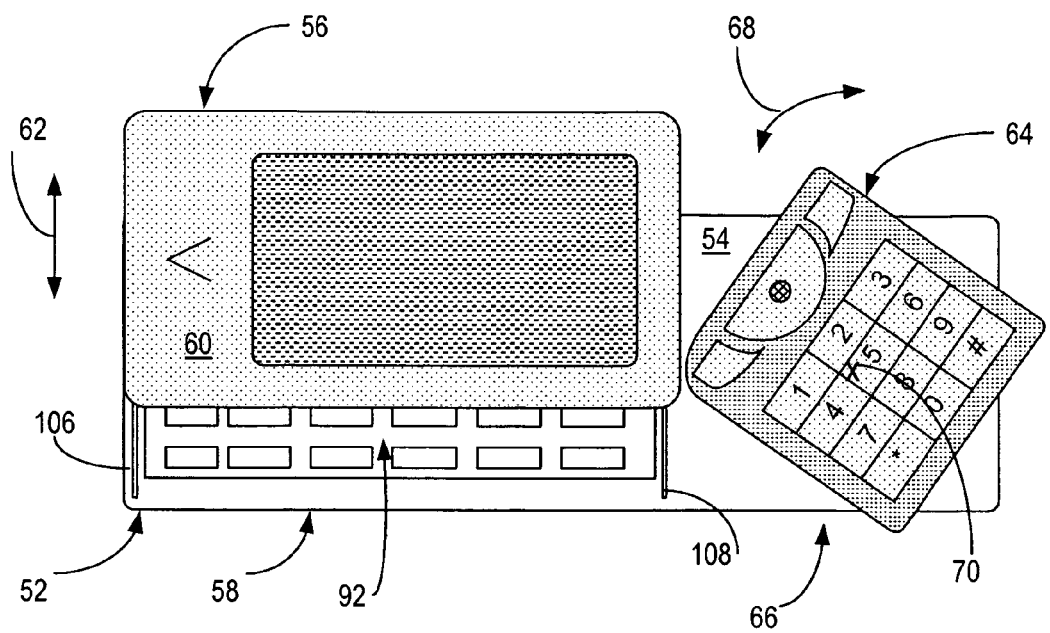
FIG. 3 is a schematic front plan view of the electronic device of FIG. 2 showing the screen body element partially slid from of its overlying relationship with the main body element to reveal keys of a key arrangement and the third body element partially rotated.
Figure 4:
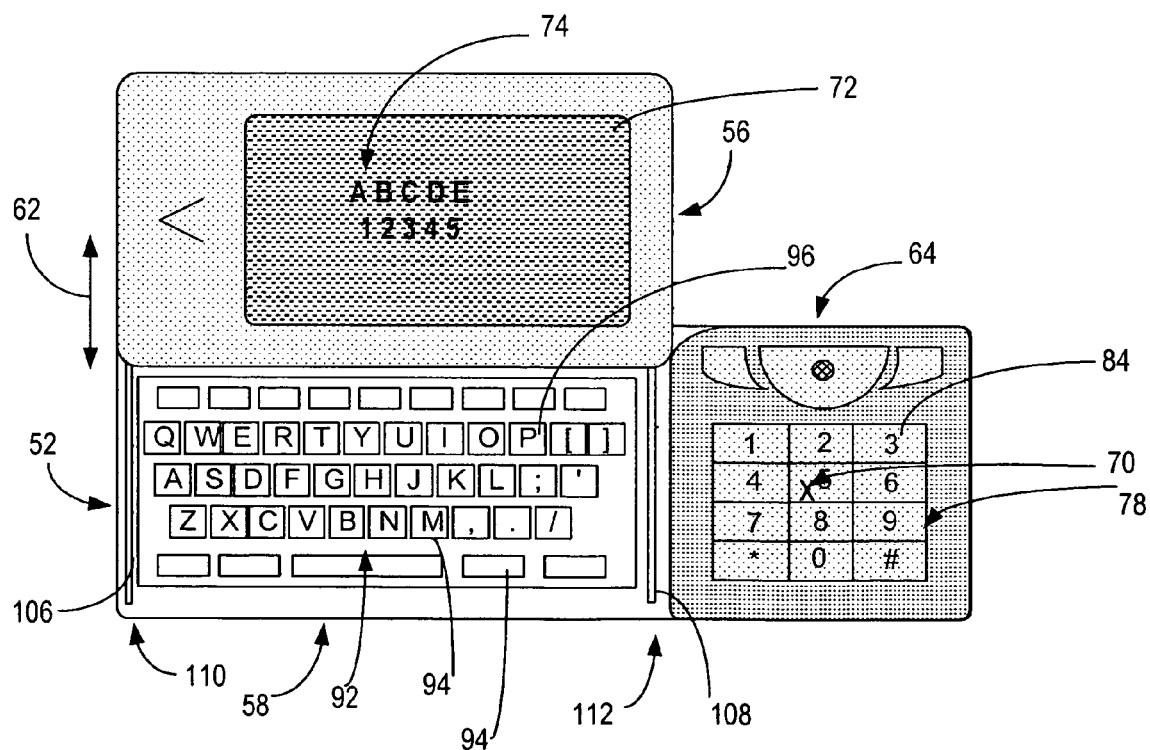
FIG. 4 is a schematic front plan view of the electronic device of FIG. 2 shown in a second operative position in a landscape orientation.

Turning now to the drawings and considering the invention in more detail and in particular with reference to FIGS. 2-6, a schematic front plan view of an electronic device embodying the present invention is illustrated schematically therein and shows for explanation purposes a mobile phone generally designated 50 in FIG. 2 in a closed first operative position. The mobile phone 50 includes a main body element 52 which has a major face surface 54. A second body element or panel generally designated 56 overlies at least one portion 58 of the main body element 52 and has a major surface 60 relative to usage. The second body element 56 is arranged for sliding engagement with the main body element 52 in a direction indicated by direction arrow 62 between the first operative closed position as illustrated in FIG. 2 and an open or second operative position as illustrated in FIG. 4. A third body element generally designated 64 overlies another portion generally designated 66 of main body element major face surface 54 and is arranged for rotational movement as indicated by the direction arrow 68 in a plane parallel to the plane of the main body element first surface 54 between the closed or first operative position as illustrated in FIG. 2 to the open or second operative position as illustrated in FIG. 4. The third body element 64 rotates about a pivot axis 70 extending substantially perpendicular through the third and main body elements.

In the illustrated embodiment, the mobile phone device 50 includes a screen 72 constructed in the second body element 56 to display graphics, text and other information well known in the trade and to the mobile phone device consuming public and users. As shown in FIG. 2, alphanumeric characters generally designated 74 for example are displayed on the screen 72 in the proper portrait viewing orientation as they would appear in normal usage of the mobile phone device 50. An earphone 76 is also carried by the second body element 56.

The third body element 64 includes a keypad generally designated 78 constructed in the surface 80 and includes an arrangement of keys 82, 82 configured to carryout an intended function. As illustrated, the arrangement of the keys 82 of the keypad 78 are configured as a communication keypad typical of the keypads used with mobile phone devices. The keys 82 carry indicia 84 which may be alphanumeric indicia conventionally used with communication keypads wherein the indicia 84 is in the proper viewing orientation with respect to the alphanumeric characters 74 displayed on the screen 72 when the mobile phone device 50 is used in the closed first operative position in a portrait orientation. The third body element 64 also includes a speaker 86, function keys 88, 90 and a navigation key 92. The operation of the mobile phone device 50 is carried out by operational and control circuitry which may be carried in the main body element 52 or elsewhere where appropriate in the mobile phone device 52 as is well known and understood by those skilled in the art and therefore such circuitry will not be explained in more detail herein.

As illustrated in FIG. 4, the open or second operative position configures the mobile phone device 50 in a landscape orientation wherein the second body element 56 is fully extended to expose a keyboard generally designated 92 constructed in a portion 58 of the main body element 52 and includes keys 94 arranged to carryout an intended function. In the second operative position, the third body element 64 is rotated 90 degrees from its orientation in the first operative position as illustrated in FIG. 2 such that the keypad 78 is in a side-by-side relationship with the keys 94, 94 of the keyboard 92 for use therewith thereby configuring the mobile device 50 with a full function keyboard wherein the orientation of the indicia 84 carried on the keypad 78 corresponds to the orientation of indicia 96 on the keys 94 of the keyboard 92. The keys 94 of the keyboard 92 may be arranged in a suitable configuration to carry out an intended function such as a QWERTY keyboard. Additionally, appropriate control circuitry within the mobile phone device 50 detects the opening of the second body element 56 to its fully extended position and changes as appropriate the orientation of the alphanumeric characters 74 displayed on the screen 72 to the proper landscape orientation coinciding the orientation of the indicia on the keypad 78 and keyboard 92.

Figure 5:
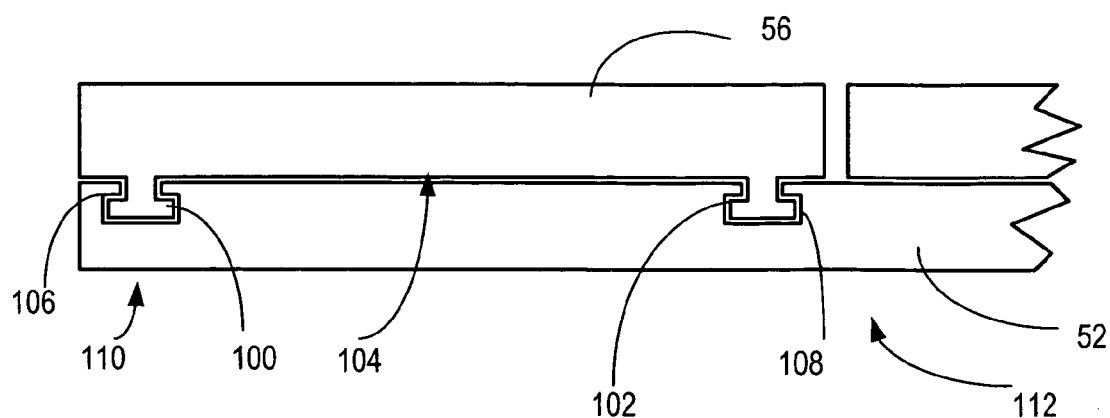
FIG. 5 is a schematic cross section fragmentary side view taken along the line 5-5 of the electronic device shown in FIG. 2.
Figure 6:
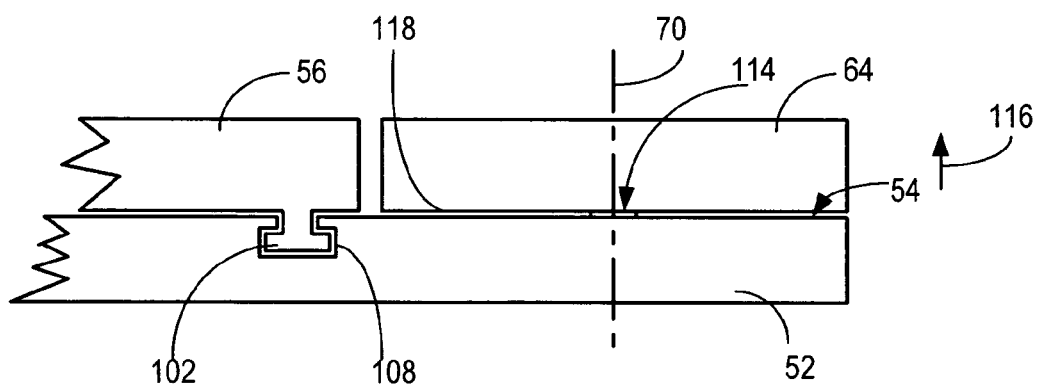
FIG. 6 is a schematic cross section fragmentary side view taken along the line 6-6 of the electronic device shown in FIG. 2.

Referring to FIGS. 5 and 6, the second body element 56 is arranged for sliding engagement with the main body element 52 by means of suitably configured interlocking rails 100, 102 extending from the inwardly facing surface 104 of the second body element 56 which rails 100, 102 are received in complementary shaped grooves 106, 108 respectively located in the surface 54 of the main body element 52 in a spaced relationship from one another at respective sides 110, 112 of the keyboard 92. The grooves 106, 108 are arranged with suitable and appropriate stops to limit the travel of the second body element 56 as it moves from its first closed operative position to its second open operative position. Other means for limiting the movement of the second body element 56 with respect to the main body element 52 are also contemplated for example, a suitably configured stop between the facing surfaces of the second body element 56 and main body element 52 engage one another when the second body element 56 is fully extended in the second open operative position and which means for limiting the travel of the second body element with respect to the first body element are well known to those skilled in the art.

The third body element 64 is arranged for rotational movement on the main body element 52 parallel to the plane of the main body element surface 54 about the pivot axis 70 by means of a spindle or other suitable element designated generally 114 to allow the third body element 64 to rotate about the pivot axis 70. Such spindles 114 are commonly known and understood by those skilled in the art for allowing rotation about the pivot axis 70 while suitably restraining the second body element 64 from movement in a direction indicated by arrow 116 away from the surface 54 of the main body element 52.

Figure 7:
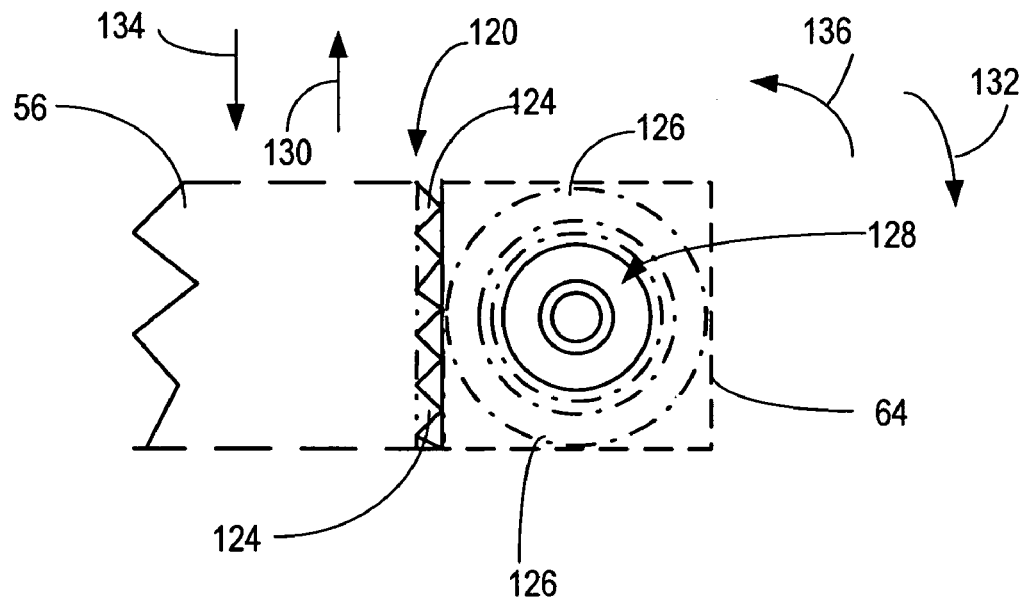
FIG. 7 is a schematic top plan view showing a rack gear along one side of the screen body element co-acting with a round gear mounted to the third body element to mechanically couple the screen body element and the third body element for respective linear and rotational movement with one another.
Figure 8:
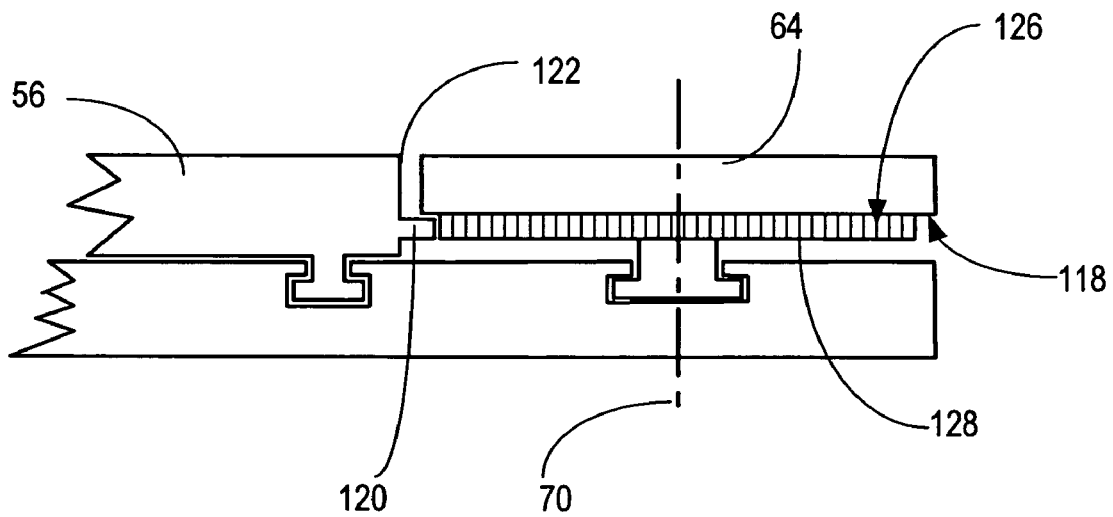
FIG. 8 is a schematic side cross section fragmentary view of the screen body element rack gear and the third body element round gear shown in FIG. 7.

Turning now to FIGS. 7 and 8, an arrangement is illustrated therein showing the second and third body elements mechanically coupled to one another so that the movement one causes the appropriate movement of the other between the closed first operative and open second operative positions. As illustrated, the second body element 56 is arranged with a rack gear generally designated 120 extending from one side 122 of the second body element 56 and includes teeth 124 for engagement and co-action with teeth 126 located on the periphery of an appropriately dimensioned round gear element 128 mounted or otherwise attached to the inward facing surface 118 of the third body element 64 such that movement of the second body element 56 in the direction indicated by direction arrow 130 causes the third body element 64 to rotate about the pivot axis 70 in the direction indicated by arrow 132 when the device is configured from its closed first operative position to its open second operative position to place the third body element 64 in its proper viewing orientation with respect to the keyboard 92. When the second body element 56 is moved in the direction indicated by arrow 134 as it would be moved from its open second operative position to its closed first operative position, the third body element 64 rotates about the pivot axis 70 in the direction indicated by arrow 136 to return the keypad 78 to its portrait orientation for operation as a communication keypad in the mobile phone device 50. Other suitable arrangements for mechanically coupling the second body element to the third body element and main body element are contemplated and are well known to those skilled in the art to carry out the intended function. For example, a motorized mechanical coupling driving the round gear 128 to move the second body element 56 in the desired direction may be utilized.

It will be recognized by those skilled in the art that the second body element 56 and third body element 64 are shaped and dimensionally configured to provide the necessary turning radius clearances during movement of the second body element 56 and third body element 64 to and from the closed first operative position and open second operative positions. It will also be recognized that the third body element 64 features a multifunctional keypad 78 which operates as a communication keypad when the device is in the closed first operative position as illustrated in FIG. 2 and as a numeric keypad to provide a full function keyboard when the device is operated in the open second operative or landscape position as illustrated in FIG. 4.

Figure 9A:
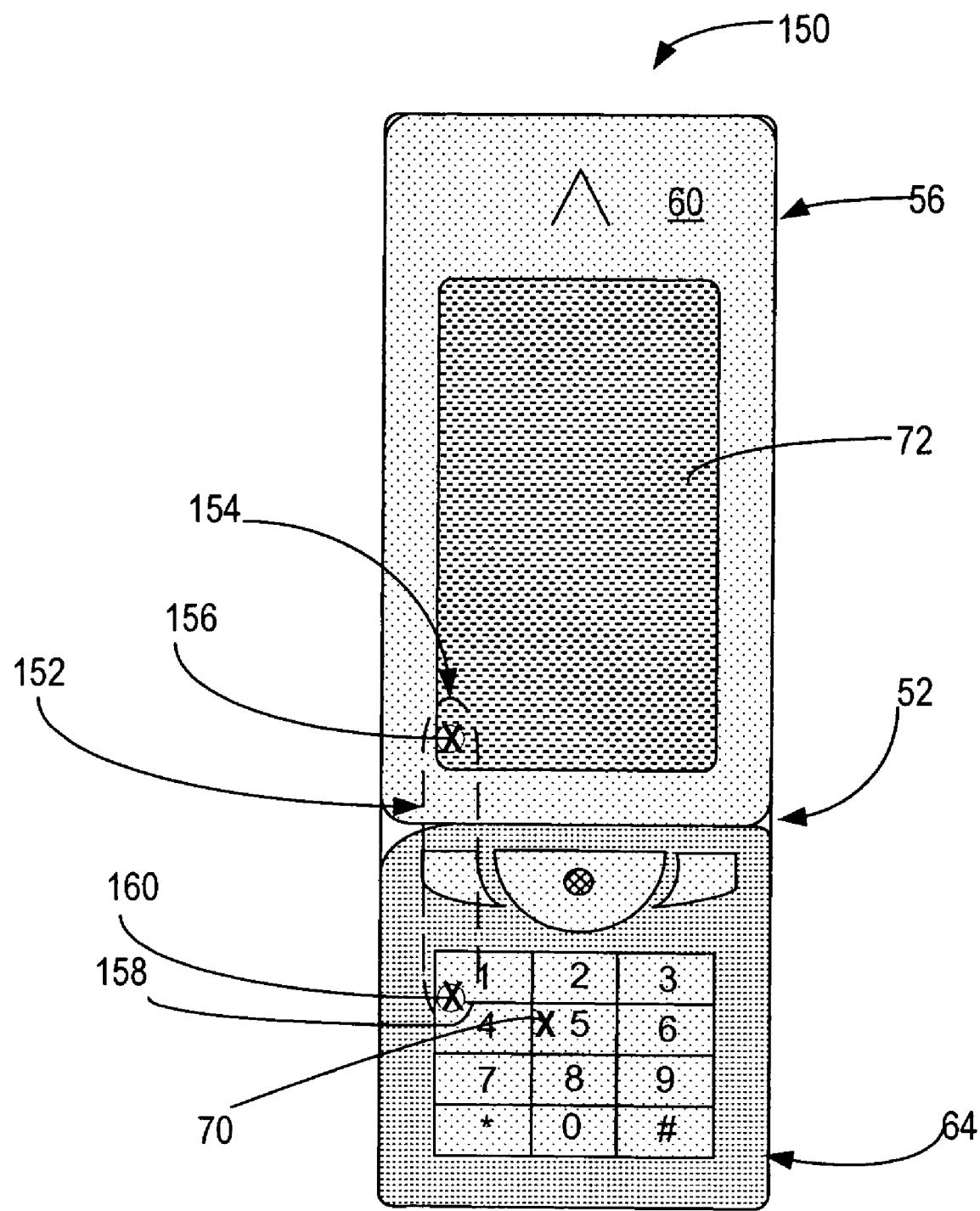
FIG. 9A is a schematic front plan view of an alternate embodiment of the present invention showing an electronic device in a first operative position in a portrait orientation.
Figure 9B:
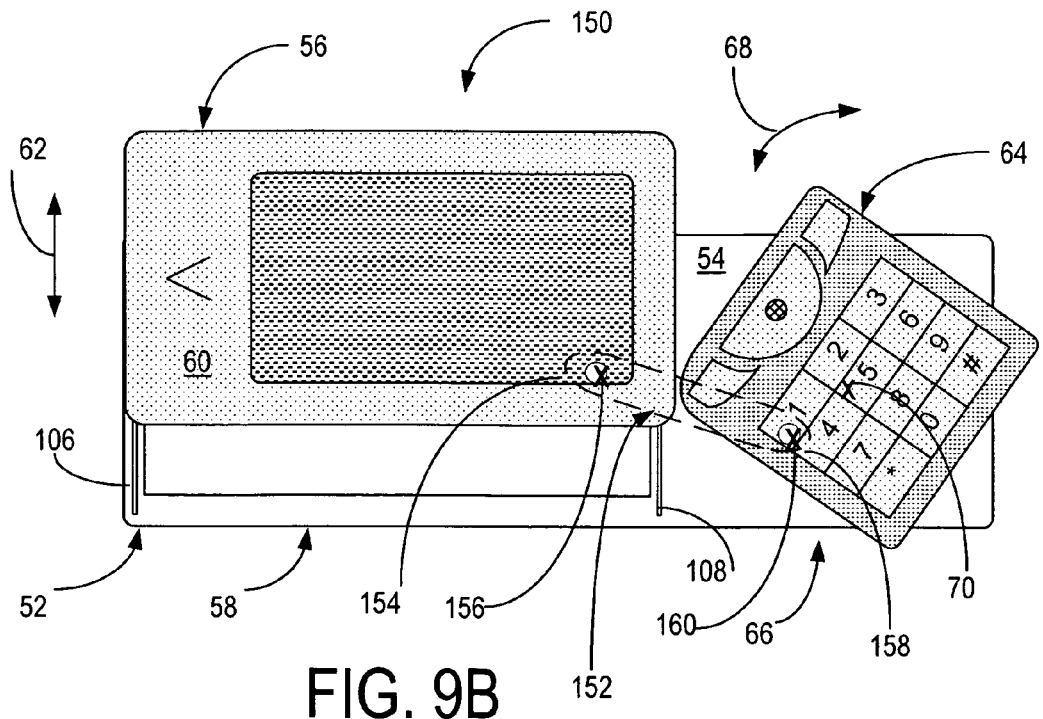
FIG. 9B is a schematic front plan view of the electronic device of FIG. 9A showing the screen body element partially slid from its overlying relationship with the main body element and the third element partially rotated.
Figure 9C:
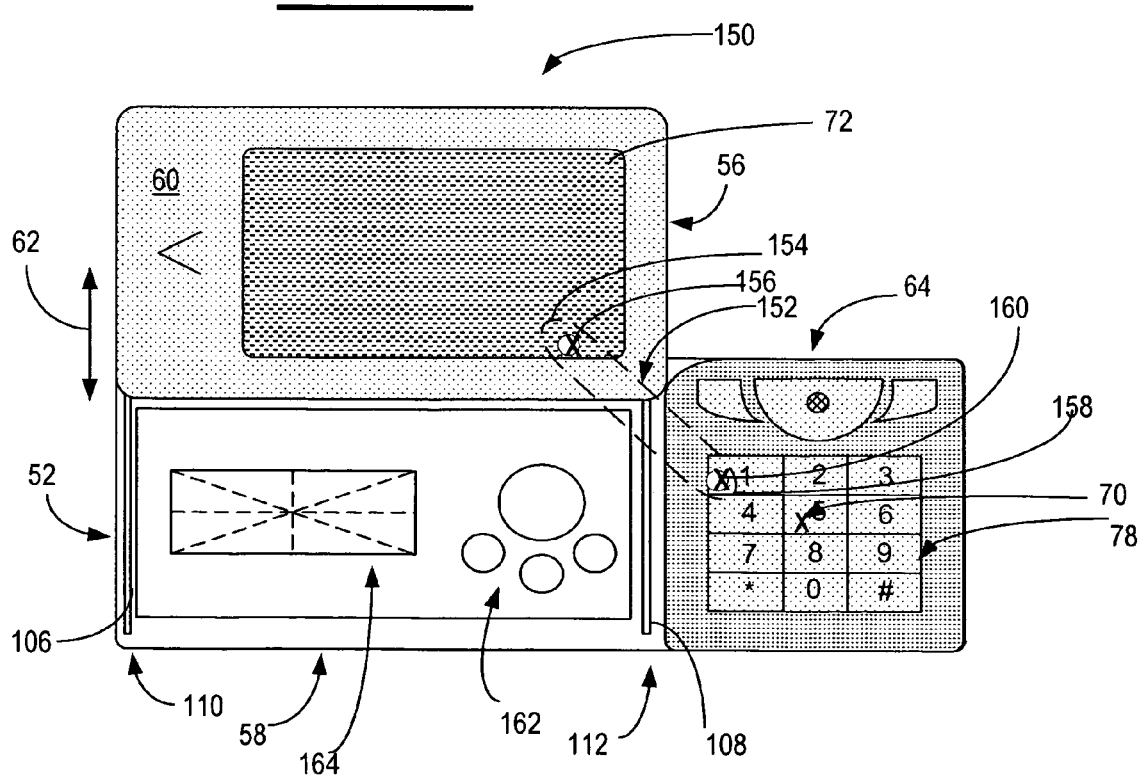
FIG. 9C is a schematic front plan view of the electronic device of FIG. 9A shown in a second operative position in a landscape orientation to reveal a game controller keypad and joystick constructed in the main body element.
Figure 10:
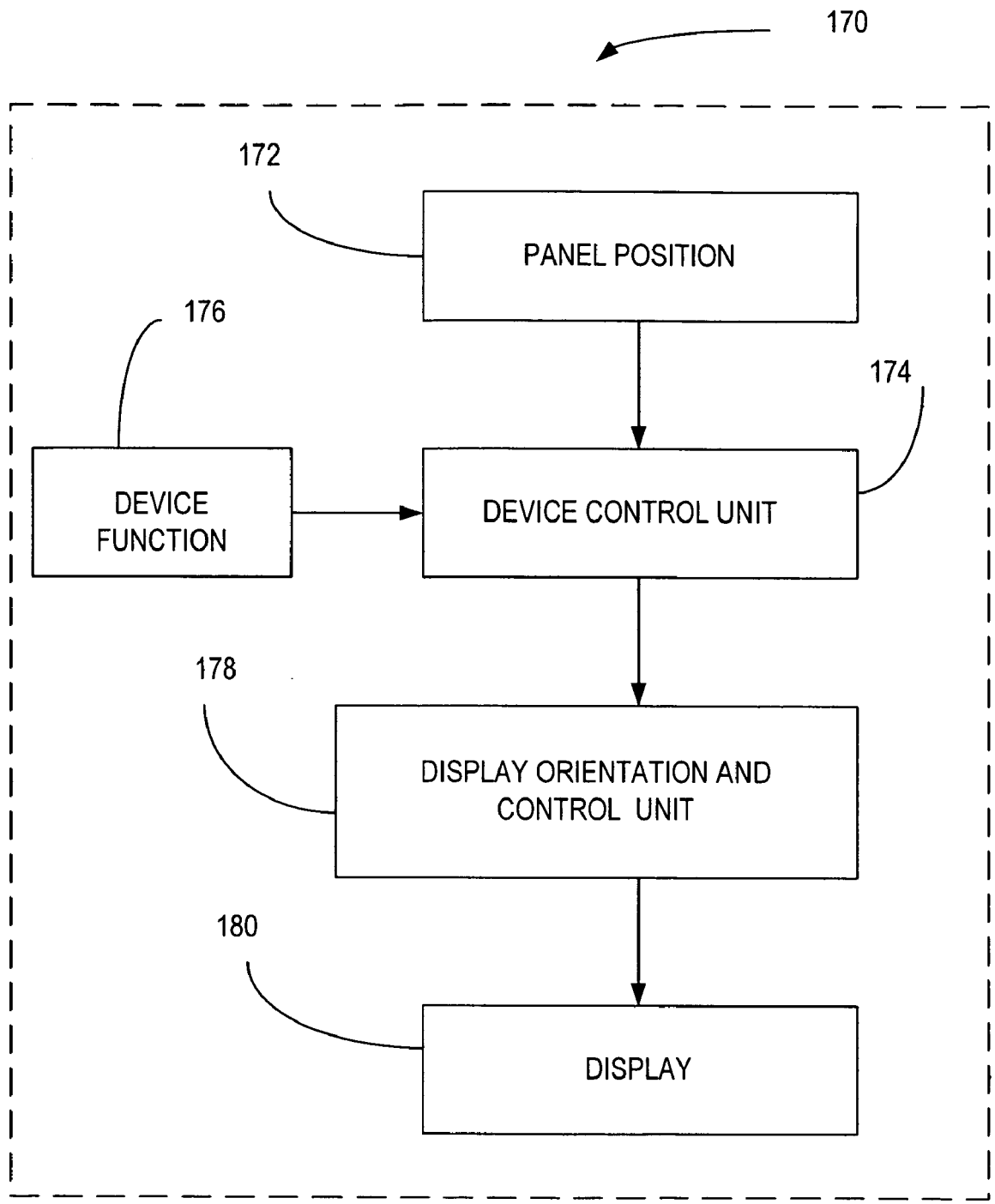
FIG. 10 is a block diagram of the control system of an electronic device embodying the present invention.

Turning now to FIGS. 9A-9B, a schematic front plan view of an alternate embodiment of the present invention is illustrated schematically therein and is similar to the embodiment illustrated in FIGS. 2-6 and like reference numerals refer to like parts therein. For purposes of explanation, a mobile phone generally designated 150 is shown in FIG. 9A in a closed first operative position. The mobile phone 150 includes a main body element 52 which has a major face surface 54. A second body element generally designated 56 overlies at least one portion 58 of the main body element 52 and has a major surface 60 relative to usage. The second body element 56 is arranged for sliding engagement with the main body element 52 in a direction indicated by the direction arrow 62 between the first operative closed position as illustrated in FIG. 9A and an open or second operative position as illustrated in FIG. 9C. A third body element generally designated 64 overlies another portion generally designated 66 of the main body element major face surface 54 and is arranged for rotational movement as indicated by the direction arrow 68 in a plane parallel to the plane of the main body element first surface 54 between the closed or first operative position as illustrated in FIG. 9A to the open or second operative position as illustrated in FIG. 9C. The third main body element 64 rotates about a pivot axis 70 extending substantially perpendicular through the third and main body elements. A hinge or swivel arm mechanism generally designated 152 couples the main body element 56 and third body element 64 and is sandwiched between the undersides of the second body element 56 and third body element 64 and the major surface 54 of the main body element 52. One end 154 of the swivel arm 152 is arranged for rotational movement about a pivot axis 156 passing substantially perpendicularly through the second body element 56. The opposite end 158 of the swivel arm 152 is arranged for rotational movement about the pivot axis 160 passing substantially perpendicularly through the third body element 64. As illustrated in FIGS. 9A-9C, the second and third body elements are mechanically coupled to one another so that the movement of one causes the corresponding responsive movement of the other between the closed first operative and open second operative positions. As illustrated in FIGS. 9A-9C, the hinge or swivel arm mechanism 152 is suitably dimensioned to provide the appropriate co-action between the second body element 56 and the third body element 64 such that movement of the second body element 56 causes the third body element to rotate about the pivot axis 70 when the device is configured between its closed first operative position and its open second operative position. The second body element 56 is arranged for sliding engagement with the main body element 52 by means of suitably configured interlocking rails 100, 102 extending from the outwardly facing surface 104 of the second body element 56 which rails 100, 102 are received in complementary shaped grooves 106, 108 respectively located in the surface 54 of the main body element 52.

As illustrated in FIG. 9C, a game controller keypad is provided in the portion 58 of the main body element 52 rather than a full function keyboard when the second body element 56 is moved to the open second operative position. The game keyboard comprises a set of action keys generally designated 162 constructed on the face 54 in the portion 58 of the main body element 52. A motion pad or joystick generally designated 164 is also constructed in the portion 58 of the main body element 52 on the face 54.

The orientation of the display and other operative functions of the electronic device are carried out by means of a system control unit 170 which is illustrated for example in the schematic functional block diagram of FIG. 15. A panel position indicator 172 provides a signal to the device control unit 174 in response to the second body element 56 being in the electronic device first operative or portrait position as shown in FIGS. 2 and 9A, or in the second operative or landscape position as shown in FIGS. 4 and 9C. The device control unit 174 may be a microprocessor, digital signal processor, a display driver or other means including both the hardware and software for carrying out the control function as well as other intended and desirable functions and may contain a suitable memory for storing respective related computer programs to perform and control the intended functions as is well known by those skilled in the art and therefore not described in detail herein. The device control unit 174 may be manually operated by the user by means of a key or other operative stimulus to provide a suitable signal to the device function 176 and which device function signal is coupled to the device control unit 174. The device control unit 174 provides an output signal corresponding to the desired orientation of the display to a display orientation and control unit 178 to orient the graphic or text shown on the display 180 as needed.

In a further embodiment, the electronic device can be utilized without a communication keypad or communication capability and used as a game unit only. Accordingly, the surface areas carrying the keypads may be configured and arranged to carry out a desired function other than a keypad function.

It will also be recognized suitable materials are used for the construction of the electronic device and the hinge or swivel arm mechanism 152 to provide and facilitate smooth operation and co-action of the main body element 52, second body element 56 and third body element 64. Such materials are well known to those skilled in the art.

A portable electronic device having multiple body elements configurable to a predetermined fixed orientation each of which define a respective different operative position has been disclosed above in several preferred embodiments. It will be recognized by those skilled in the art that numerous changes and modifications may be made without departing from the scope of the invention as described above. Therefore, the invention has been described by way of illustration rather than limitation.

The invention claimed:

1. A portable electronic device, comprising:
   a first body element having a first major surface;
   a second body element having a first major outwardly facing surface;
   a third body element having a first major outwardly facing surface;
   said second body element and said third body element being in an overlying relationship with said first body element;
   said third body element mechanically coupled to said first body element;
   said second body element mechanically coupled to said first body element and further mechanically coupled to said third body element, wherein each of said second and third body elements is arranged for relative movement with respect to said first body element and one another to configure said first body element, said second body element and said third body element in a number of predetermined fixed orientations, whereby each of said predetermined fixed orientations defines a corresponding respective different operative position;
   said second body element being configured in a portrait orientation with respect to said third body element and defining a first operative position; and
   said first body element and said second body element further being arranged for slideable movement with respect to one another between said first operative position and a second operative position wherein said second body element is slideably moved alone a linear path in a first direction into a substantially non-overlying relationship with said first body element and out of said portrait orientation with respect to said third body element and defining said second operative position in which said first body element, second body element and third body element are configured in a substantially landscape orientation.

2. The portable electronic device as defined in claim 1 further comprising:
   said third body element further being arranged for rotational movement about a pivot axis passing substantially perpendicular through said third body element first major outwardly facing surface and said first main body element first major surface for rotating said third body element between a first fixed orientation in said first operative position and a second fixed orientation in said second operative position.

3. The portable electronic device as defined in claim 2 further comprising:
   a display screen constructed in said second body element;
   a first key arrangement constructed in said third body element;
   a second key arrangement constructed in at least a portion of said first main body element wherein in said first operative position said second key arrangement is covered by said second body element and not accessible by a user and wherein in said second operative position said second key arrangement is exposed and available for access and use by a user.

4. The portable electronic device as defined in claim 2 further comprising said second body element and said third body element being mechanically coupled to one another whereby movement of one of said second and third body elements between said first and second fixed orientations causes the other of said second and third body elements to move between said first and second fixed orientations, respectively.

5. The portable electronic device as defined in claim 4 further comprising said second body element arranged with a rack gear and said third body element arranged with a round gear each gear having teeth for co-action with one another for causing said movement of said second and third body elements.

6. The portable electronic device as defined in claim 4 further comprising a swivel arm mechanism sandwiched between said second and third body elements and said main body element, said swivel arm mechanism having one end arranged for rotational movement about a second pivot axis passing substantially perpendicular through said second body element and an end opposite said one end arranged for rotational movement about a third pivot axis passing substantially perpendicular through said third body element.

7. The portable electronic device as defined in claim 3 wherein said third body element first key arrangement further comprises a communication keypad in said first operative position.

8. The portable electronic device as defined in claim 3 wherein said first main body element second key arrangement is arranged in accordance with a desired function to be carried out.

9. The portable electronic device as defined in claim 8 wherein said first main body element second key arrangement is arranged as a QWERTY keyboard.

10. The portable electronic device as defined in claim 3 wherein said third body element first key arrangement is arranged in accordance with a desired function to be carried out.

11. The portable electronic device as defined in claim 10 wherein said third body element first key arrangement is arranged as a numeric keyboard.

12. The portable electronic device as defined in claim 3 further comprising a mobile device.

13. The portable electronic device as defined in claim 3 further comprising said first fixed orientation being a portrait orientation and said second fixed orientation being a landscape orientation.

14. The portable electronic device as defined in claim 13 further including means for automatically changing if necessary the orientation of a display shown on said screen when said portable electronic device is moved between said first and second fixed orientations, respectively.

15. An electronic device, comprising:
a first main body element having a first surface;
a first panel overlying at least one portion of said main body element first surface and further having a surface relative to usage and arranged for sliding engagement with said main body element first surface, whereby in a first fixed configuration said at least one portion of said main body element first surface is covered and not available for usage and in said second fixed configuration said at least one portion of said main body element first surface is uncovered and available for usage, and
a second panel overlying another portion of said main body element first surface and arranged for rotational movement on said main body element parallel to the plane of said main body element first surface, whereby in said first fixed configuration said second panel is in a first orientation and in positional alignment adjacent said first panel and in said second fixed configuration said second panel is rotated on said main body element to a second orientation and in positional alignment adjacent said at least one portion of said main body element first surface, wherein said first panel and said second panel are mechanically coupled and arranged for relative movement with respect to said first main body element and one another whereby said first main body element, said first panel and said second panel are configured to move into said first fixed configuration or said second fixed configuration.

16. The electronic device as defined in claim 15 further comprising a game controller keypad constructed in said at least one portion of said main body element first surface.

17. The electronic device as defined in claim 16 further comprising a portable electronic device.

18. The electronic device as defined in claim 17 further comprising a mobile device.

19. The electronic device as defined in claim 16 further comprising a game unit.

20. A portable electronic device, comprising:
a first main body element having a first major surface relative to usage;
a second body element having a first major surface relative to usage;
a third body element having a first major surface relative to usage;
a display screen constructed in said second body element;
a first key arrangement constructed in said third body element in accordance with an intended function;
a second key arrangement constructed in at least a portion of said main body element in accordance with an intended function;
said first main body element and said second body element further being arranged for slideable movement with respect to one another wherein said second body element moves along a linear path in a first direction into a non-overlying relationship with said first main body element;
said third body element further being arranged for rotational movement about a pivot axis passing substantially perpendicular through said third body element and said first main body element for rotating said third body element in a plane parallel to the plane of said first main body element first major surface;
said second body element and said third body element being mechanically coupled and arranged for relative movement with respect to said first main body element;
said first main body element, said second body element and said third body element being mechanically coupled and arranged for relative movement with respect to one another to configure the portable electronic device in one of a portrait fixed orientation and landscape fixed orientation, whereby indicia carried on keys comprising said first key arrangement maintain proper positional orientation with respect to indicia carried on keys comprising said second key arrangement constructed in said at least a portion of said main body element.

21. Computer program carried on a storage medium and executable by a processor in an electronic device for automatically changing, if required, the orientation of information shown on a display of the electronic device when the electronic device is used in its first open operative position and in its second open operative position wherein the electronic device comprises:
a first main body element having a first major surface relative to usage;
a second body element having a first major surface relative to usage;
a third body element having a first major surface relative to usage;
a display screen constructed in said second body element;
a first key arrangement constructed in said third body element in accordance with an intended function;
a second key arrangement constructed in at least a portion of said main body element in accordance with an intended function;
said first main body element and said second body element further being arranged for slideable movement with respect to one another wherein said second body element moves along a linear path in a first direction into a non-overlying relationship with said first main body element;
said third body element further being arranged for rotational movement about a pivot axis passing substantially perpendicular through said third body element and said first main body element for rotating said third body element in a plane parallel to the plane of said first main body element first major surface;
said second body element and said third body element being mechanically coupled and arranged for relative movement with respect to said first main body element;
said first main body element, said second body element and said third body element being mechanically coupled and arranged for relative movement with respect to one another to configure the portable electronic device in one of a portrait fixed orientation and landscape fixed orientation, whereby indicia carried on keys comprising said first key arrangement maintain proper positional orientation with respect to indicia carried on keys comprising said second key arrangement constructed in said at least a portion of said main body element, and whereby information shown on the display is automatically shown in the corresponding portrait and landscape orientation.

22. A method, comprising:

providing a device comprising a first body element having a first major surface relative to usage, a second body element having a first major surface relative to usage, and a third body element having a first major surface relative to usage;

arranging said second body element and said third body element in an overlying relationship with said first body element;

mechanically coupling said third body element to said first body element;

mechanically coupling said second body element to said first body element;

mechanically coupling said second body element to said third body element, wherein each of said second and third body elements is arranged for relative movement with respect to said first body element and one another for configuring said first body element, said second body element and said third body element in a number of predetermined fixed orientations, whereby each of said predetermined fixed orientations defines a corresponding respective different operative position;

arranging said second body element in a portrait orientation with respect to said third body element and defining a first operative position; and arranging said first body element and said second body element for slideable movement with respect to one another between said first operative position and a second operative position wherein said second body element is slideably moved along a linear path in a first direction into a substantially non-overlying relationship with said first body element and out of said portrait orientation with respect to said third body element and defining said second operative position in which said first body element, second body element and third body element are configured in a substantially landscape orientation.

23. The method as defined in claim 22 further comprising:

arranging said third body element for rotational movement about a pivot axis passing substantially perpendicular through said third body element first major outwardly facing surface and said first main body element first major surface for rotating said third body element between a first fixed orientation in said first operative position and a second fixed orientation in said second operative position.

24. The method as defined in claim 23 further comprising:

constructing a display screen in said second body element;
constructing a first key arrangement in said third body element;
constructing a second key arrangement in at least a portion of said first main body element wherein in said first operative position said second key arrangement is covered by said second body element and not accessible, and wherein in said second operative position said second key arrangement is exposed and accessible.

25. The method as defined in claim 23 further comprising mechanically coupling said second body element and said third body element to one another whereby movement of one of said second and third body elements between said first and second fixed orientations causes the other of said second and third body elements to move between said first and second fixed orientations, respectively.

26. The method as defined in claim 25 further comprising arranging said second body element with a rack gear and arranging said third body element with a round gear, each gear having teeth for co-action with one another for causing said movement between said second and third body elements.

27. The method as defined in claim 25 further comprising providing a swivel arm mechanism sandwiched between said second and third body elements and said main body element, said swivel arm mechanism having one end arranged for rotational movement about a second pivot axis passing substantially perpendicular through said second body element and an end opposite said one end arranged for rotational movement about a third pivot axis passing substantially perpendicular through said third body element.

28. The method as defined in claim 24 wherein said third body element first key arrangement further comprises a communication keypad in said first operative position.

29. The method as defined in claim 24 wherein said first main body element second key arrangement is arranged in accordance with a desired function to be carried out.

30. The method as defined in claim 29 wherein said first main body element second key arrangement is arranged as a QWBRTY keyboard.

31. The method as defined in claim 24 wherein said third body element first key arrangement is arranged in accordance with a desired function to be carried out.

32. The method as defined in claim 31 wherein said third body element first key arrangement is arranged as a numeric keyboard.

33. The method as defined in claim 24 wherein said device is a mobile device.

34. The method as defined in claim 24 wherein said first fixed orientation is a portrait orientation and said second fixed orientation is a landscape orientation.

35. The method as defined in claim 24 further comprising automatically changing if necessary the orientation of a display shown on said screen when said device is moved between said first and second fixed orientations, respectively.

36. An apparatus, comprising:

means for providing a device comprising a first body element having a first major surface relative to usage, a second body element having a first major surface relative to usage, and a third body element having a first major surface relative to usage;

means for arranging said second body element and said third body element in an overlying relationship with said first body element;

means for mechanically coupling said third body element to said first body element;

means for mechanically coupling said second body element to said first body element;

means for mechanically coupling said second body element to said third body element, wherein each of said second and third body elements is arranged for relative movement with respect to said first body element and one another for configuring said first body element, said second body element and said third body element in a number of predetermined fixed orientations, whereby each of said predetermined fixed orientations defines a corresponding respective different operative position;

means for arranging said second body element in a portrait orientation with respect to said third body element and defining a first operative position; and means for arranging said first body element and said second body element for slideable movement with respect to one another between said first operative position and a second operative position wherein said second body element is slideably moved along a linear path in a first direction into a substantially non-overlying relationship with said first body element and out of said portrait orientation with respect to said third body element and defining said second operative position in which said first body element, second body element and third body element are configured in a substantially landscape orientation.

37. The apparatus as defined in claim 36 further comprising:
means for arranging said third body element for rotational movement about a pivot axis passing substantially perpendicular through said third body element first major outwardly facing surface and said first main body element first major surface for rotating said third body element between a first fixed orientation in said first operative position and a second fixed orientation in said second operative position.

38. The apparatus as defined in claim 36 further comprising:
means for constructing a display screen in said second body element;
means for constructing a first key arrangement in said third body element;
means for constructing a second key arrangement in at least a portion of said first main body element wherein in said first operative position said second key arrangement is covered by said second body element and not accessible, and wherein in said second operative position said second key arrangement is exposed and accessible.

39. The apparatus as defined in claim 36 further comprising means for mechanically coupling said second body element and said third body element to one another whereby movement of one of said second and third body elements between said first and second fixed orientations causes the other of said second and third body elements to move between said first and second fixed orientations, respectively.

40. The apparatus as defined in claim 39 further comprising means for arranging said second body element with a rack gear and arranging said third body element with a round gear, each gear having teeth for co-action with one another for causing said movement between said second and third body elements.

41. The apparatus as defined in claim 39 further comprising means for providing a swivel arm mechanism sandwiched between said second and third body elements and said main body element, said swivel arm mechanism having one end arranged for rotational movement about a second pivot axis passing substantially perpendicular through said second body element and an end opposite said one end arranged for rotational movement about a third pivot axis passing substantially perpendicular through said third body element.

* * * * *

UNITED STATES PATENT AND TRADEMARK OFFICE
CERTIFICATE OF CORRECTION

| | | |
|---|---|---|
| PATENT NO. | : 7,507,044 B2 | Page 1 of 1 |
| APPLICATION NO. | : 11/230069 | |
| DATED | : March 24, 2009 | |
| INVENTOR(S) | : Pasi Kemppinen | |

It is certified that error appears in the above-identified patent and that said Letters Patent is hereby corrected as shown below:

In column 14, line 26, claim 30, line 3 "QWBRTY" should be --QWERTY--.

Signed and Sealed this

Twenty-sixth Day of May, 2009

JOHN DOLL
*Acting Director of the United States Patent and Trademark Office*